United States Patent

Watanabe et al.

[11] Patent Number: 6,006,711
[45] Date of Patent: Dec. 28, 1999

[54] SPARK PLUG FUNCTION INCORPORATED ENGINE VALVE AND VALVE MECHANISM

[75] Inventors: Akira Watanabe; Shoji Hasegawa, both of Hadano, Japan

[73] Assignee: Nittan Valve Company, Limited, Tokyo, Japan

[21] Appl. No.: 09/117,183

[22] PCT Filed: Jul. 15, 1996

[86] PCT No.: PCT/JP96/01965

§ 371 Date: Jul. 29, 1998

§ 102(e) Date: Jul. 29, 1998

[87] PCT Pub. No.: WO97/42402

PCT Pub. Date: Nov. 13, 1997

[30] Foreign Application Priority Data

May 2, 1996 [JP] Japan ................................. 8-111438

[51] Int. Cl.⁶ .......................................... F02P 13/00
[52] U.S. Cl. ........................ 123/151; 123/152; 313/125
[58] Field of Search ................................. 123/151, 156; 313/125

[56] References Cited

U.S. PATENT DOCUMENTS

| 3,982,506 | 9/1976 | Holtrop | 123/264 |
| 5,000,135 | 3/1991 | Taguma | 123/151 |
| 5,463,267 | 10/1995 | Conway | 313/141 |

FOREIGN PATENT DOCUMENTS

| 60-118331 | 8/1985 | Japan . |
| 64-56915 | 3/1989 | Japan . |
| 64-56917 | 3/1989 | Japan . |
| 1-85470 | 6/1989 | Japan . |
| 6-25521 | 4/1994 | Japan . |

Primary Examiner—Willis R. Wolfe
Assistant Examiner—Mahmoud M. Gimie
Attorney, Agent, or Firm—Sixbey Friedman Leedom & Ferguson; Thomas W. Cole

[57] ABSTRACT

A spark plug and an engine valve member are integrally combined in the same structure by forming an ignition gap between a first electrode rod which is the center electrode incorporated in an engine valve body and a second electrode portion which is the grounding electrode formed to be integral with or incorporated in the engine valve body. The resulting structure has the features of both a spark plug and an engine valve and is advantageously compact and applicable to gasoline engines in general.

9 Claims, 8 Drawing Sheets

PRIOR ART

SPARK PLUG FUNCTION INCORPORATED ENGINE VALVE AND VALVE MECHANISM

FIELD OF THE INVENTION

The present invention relates to an engine valve integral with spark plug features and a valve operating mechanism equipped with an engine valve integral with spark plug features.

PRIOR ART

There are some prior arts with respect to an engine valve which is provided with both features of a spark plug and those of an engine valve, which are, for example, a first technology (Japanese Laid-open Utility Model No. 11833 of 1985) shown in FIG. 8 and a second technology (U.S. Pat. No. 3,982,506) shown in FIG. 9.

The first technology is constructed so that a spark plug 31 is screwed into a cylindrical hollow type valve stem 32 to be integral with each other, and the second technology is also constructed so that the spark plug 31 is screwed into the cylindrical hollow type valve stem 32 to be integral with each other.

That is, in any one of the technologies, such a construction is employed, in which an independently formed spark plug component is screwed into a cylindrical hollow type valve stem of an engine valve which is formed separately therefrom.

Since the abovementioned prior arts have the following problems and shortcomings, it is remarkably difficult to employ them in general gasoline engines.

(1) Taking into consideration a construction in which a plug is screwed into a cylindrical hollow stem of a valve and the caliber of a spark plug removing tool such as a plug wrench, etc., the outer diameter of an engine valve body is increased to cause the weight to be accordingly increased, whereby the load of operating the valve is unavoidably increased.

(2) Since the caliber of the engine valve body is large, the valve accommodation space of a valve operating mechanism is enlarged to cause the layout of the valve operating mechanism to be limited, and the heat efficiency is worsened.

Therefore, the invention was developed in view of solving the problems and shortcomings of the prior arts, and it is therefore an object of the invention to provide an engine valve integral with spark plug features, which is applicable to general gasoline engines and has compact dimensions.

DISCLOSURE OF THE INVENTION

In order to achieve the abovementioned object, the invention employs a means for forming major components of a spark plug integrally with an engine valve member.

That is, the means is such that spark plug features are made integral with an engine valve by burying the first electrode rod, which is exposed to the cylinder-side plane of a bevel portion and constitutes the center electrode, in the engine valve body in which the bevel portion for closing the intake and exhaust pass open to the cylinder is formed to be integral with the valve stem and forming the second electrode portion which is exposed to be L-shaped from the cylinder-side plane of the bevel portion and constitutes the grounding electrode opposite to the center electrode.

Herein, either of a conductive material or insulative material may be used as an engine valve body member.

Firstly, in an engine valve body which is made of conductive material in order to function as a conductive line, the first electrode rod which becomes the center electrode is buried in the valve body with an insulative material intervened between the electrode and the engine valve body, and the second electrode portion which is opposite to the center electrode and constitutes the grounding electrode forming a spark gap is provided on the cylinder-side plane of the bevel portion to be integral with the engine valve body.

Next, in an engine valve body which is made of insulative material, while the first electrode rod of the center electrode is formed by burying the same in the valve stem, the second electrode portion which is opposite to the first electrode rod on the cylinder-side plane of the bevel portion and constitutes the grounding electrode forming a spark gap is provided so that the same is caused to pass from the valve stem head portion through right below the bevel portion of the valve body and is formed by exposing one end of the electrode rod extending into the engine valve body to the cylinder-side plane of the bevel portion.

As a current feeding means for causing a spark plug, which is made integral with the engine valve body, to spark, such a means for transmitting electric energy to the center electrode is employed, in which a current collector ring which has continuity to the first electrode rod is circumferentially attached to the outer circumference of the valve stem portion, and the tip end of an electric energy feeding electrode element for ignition, which is connected to an electric energy generator for ignition such as an ignition coil or a distributor, or the allotter thereof, and is pressed and retained by a spring, is caused to slide on the outer circumferential surface of the current collector ring.

Furthermore, it is possible to provide a valve operating means as shown below, by an engine valve integral with spark plug features according to the invention.

Firstly, the means is such that the same is based on a valve operating mechanism which comprises a cam shaft which rotates in interlock with drive of an engine and a cam which is fixed to be integral with the cam shaft and is caused to slide on the upper end portion of the engine valve stem portion, and causes the engine valve to be opened and closed in interlock with rotations of the cam. That is, the valve operating means is such that a current feeding pass is disposed at the cam shaft and cam which are used in the valve operating mechanism, one end of the valve operating means is connected to the electric energy generator for ignition such as an ignition coil or distributor, etc. or the allotter thereof, and the other end thereof is exposed to the cam surface through inside the cam shaft and cam and is brought into contact with the first electrode rod exposed to the upper end portion of the valve stem.

Furthermore, in this valve operating means, at the contact point where the feeder pass exposed to the cam surface is brought into contact with the first electrode rod exposed to the upper end portion of the valve stem, a means by which the continuity at the contact point is made more reliable may be made available by using an electric energy feeding electrode element for ignition, which is internally incorporated in the cam and pressed and retained by a conductive spring in a direction along which the tip end of the spring is caused to protrude from the cam surface.

Another valve operating means according to the invention is such that the same is based on a valve operating mechanism which is provided with a cam shaft which rotates in interlock with drive of an engine, a cam fixed to be integral with the cam shaft, and a rocker arm, which is caused to rock in interlock with rotations of the cam, having one end slidably brought into contact with the cam and the other end brought into contact with the upper end portion of the engine valve and which is able to open and close the engine valve in interlock with rocking of the rocker arm. That is, the first feeder pass having one end connected to an electric energy generator for ignition such as an ignition coil or distributor, etc., or an allotter thereof and having the other end exposed to the cam surface through inside the cam shaft and cam, which feed current to the center electrode forming an electric energy feeding movable contact for ignition is provided at the cam shaft used for the valve operating mechanism. Simultaneously, the valve operating means is also such that a feeder pass having one end exposed to the sliding surface with the cam and brought into contact with the movable contact of the first feeder pass and the other exposed to the valve stem fixing surface and brought into contact with the first electrode rod exposed to the upper end portion of the valve stem, which feeds current to the second center electrode is provided at the rocker arm.

At the contact point with the first electrode rod of the second feeder pass and/or the contact point with the first feeder pass, a means may be also available, which makes the continuity at these contact points more reliable by using an electric energy feeding electrode element for ignition, disposed in the rocker arm, which is pressed and retained in a direction along which the tip end thereof is caused to protrude from the rocker arm surface by a conductive spring.

Furthermore, the valve operating means is such that the same is based on a valve operating mechanism which is provided with a cam shaft which rotates in interlock with drive of an engine, a cam fixed to be integral with the abovementioned cam shaft, and a rocker arm having one end slidably brought into contact with the abovementioned cam and the other end brought into contact with the upper end portion of the engine valve described in claim 1 and which is able to open and close the engine valve in interlock with rocking of the rocker arm. Such a means may be provided, where a feeder pass, which feeds current to the second center electrode, having one end connected to an electric energy generator for ignition such as an ignition coil or distributor, etc. or the allotter thereof via a pivotal shaft of the rocker arm and the other end exposed to the fitting surface of the valve stem through inside the rocker arm and brought into contact with the first electrode exposed to the upper end portion of the valve stem, is attached to the rocker arm.

BEST MODE OF CARRYING OUT THE INVENTION

Next, a description is given of embodiments of the invention with reference to the accompanying drawings.

Figure 1:
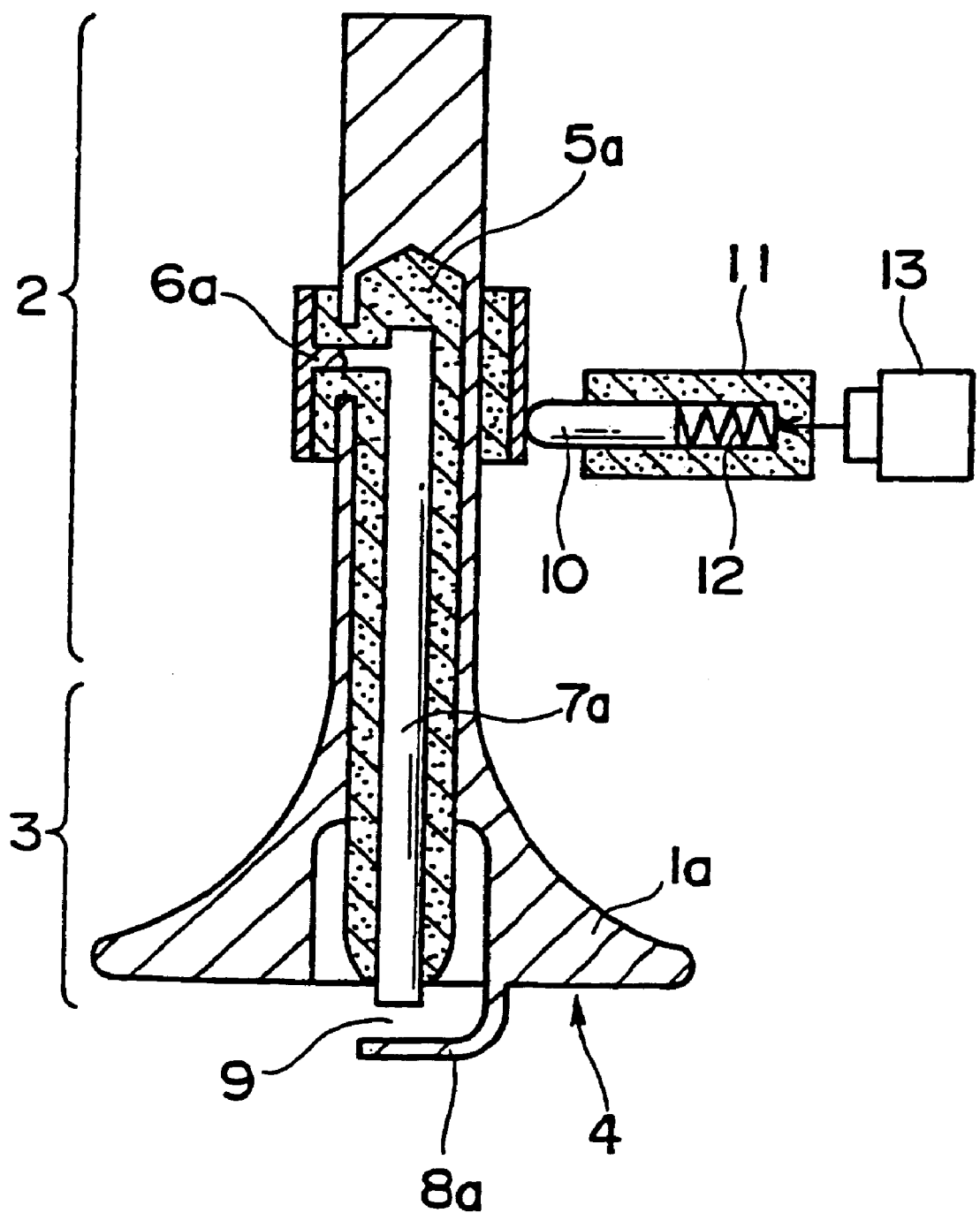
FIG. 1 is a longitudinally sectional view of major parts of an engine valve integral with spark plug features, which is made of conductive material, according to a first embodiment of the invention.

FIG. 1 illustrates the first preferred embodiment of the invention, which is a longitudinally sectional view of major parts of an engine valve integral with spark plug features, the body of which is made of conductive material such as iron, etc.

The engine valve body 1a is constructed so that the stem portion 2 is formed to be integral with the bevel part 3. An L-shaped second electrode portion 8a made of the same conductive material as that of the valve body 1a and formed to be integral therewith is provided at the cylinder-side plane 4 downward of the bevel portion 3. The first electrode rod 7a which constitutes a center electrode is buried in the valve body 1a, wherein one end thereof is exposed to the center of the cylinder-side plate 4, is opposite to the second electrode portion 8a which constitutes the grounding electrode, and forms a spark gap 9.

Furthermore, the first electrode rod 7a is incorporated in the valve body 1a with insulation material 5a intervened between the first electrode rod 7a and the valve body 1a, and is connected to a current collector ring 6a circumferentially attached to the outer circumference of the stem portion 2 with the insulative material 5a intervened between the same electrode rod 7a and the stem portion 2 of the valve body 1a.

The tip end of an electric energy feeding electrode element 10 for ignition, which is connected to an electric energy generator for ignition such as an ignition coil or distributor, etc. or the allotter 13 thereof, is slidably brought into contact with the current collector ring 6a. The electric energy feeding electrode element 10 for ignition is pressed and retained by a compression spring 12 accommodated in the insulative retainer 11 in a direction of protrusion, wherein the tip end thereof is slidably brought into contact with the current collector ring 6a in order to cause electric energy for ignition to be conductive from the electric energy generator for ignition such as the ignition coil or distributor, etc., or the allotter thereof 13 to the current collector ring 6a, and the electric energy is introduced to the first electrode rod 7a of the center electrode, thereby causing a feeding pass to be formed in order to spark at the spark gap 9.

Figure 2:
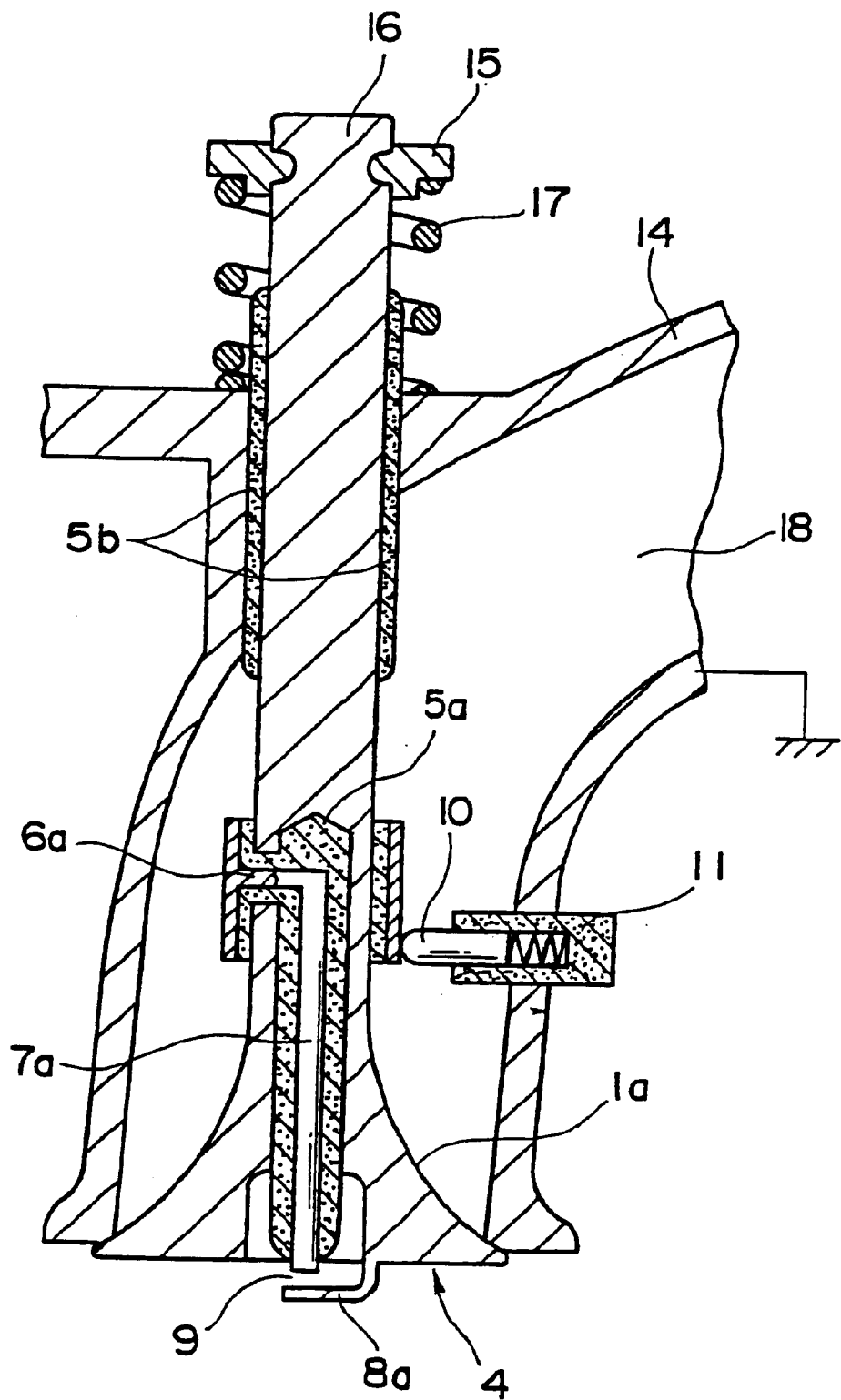
FIG. 2 is a cross-sectional view showing an incorporation of the same valve into the cylinder head.

FIG. 2 is a cross-sectional view of incorporation of an engine valve integral spark plug features, made of conductive material shown in FIG. 1, into the cylinder head 14.

The engine valve body 1a is pressed by a valve spring 17 incorporated in the cylinder head 14 in the direction of closing the intake and exhaust pass 18, and the stem head 16 is supported by a cotter 15.

Furthermore, insulative material 5b is caused to intervene between the engine valve body 1a and the cylinder head 14 earthed via the vehicle body.

The electric energy feeding electrode element 10 for ignition is provided to be retained by the insulation retainer 11 fixed on the wall of the intake and exhaust pass 18 of the cylinder head 14.

Figure 3:
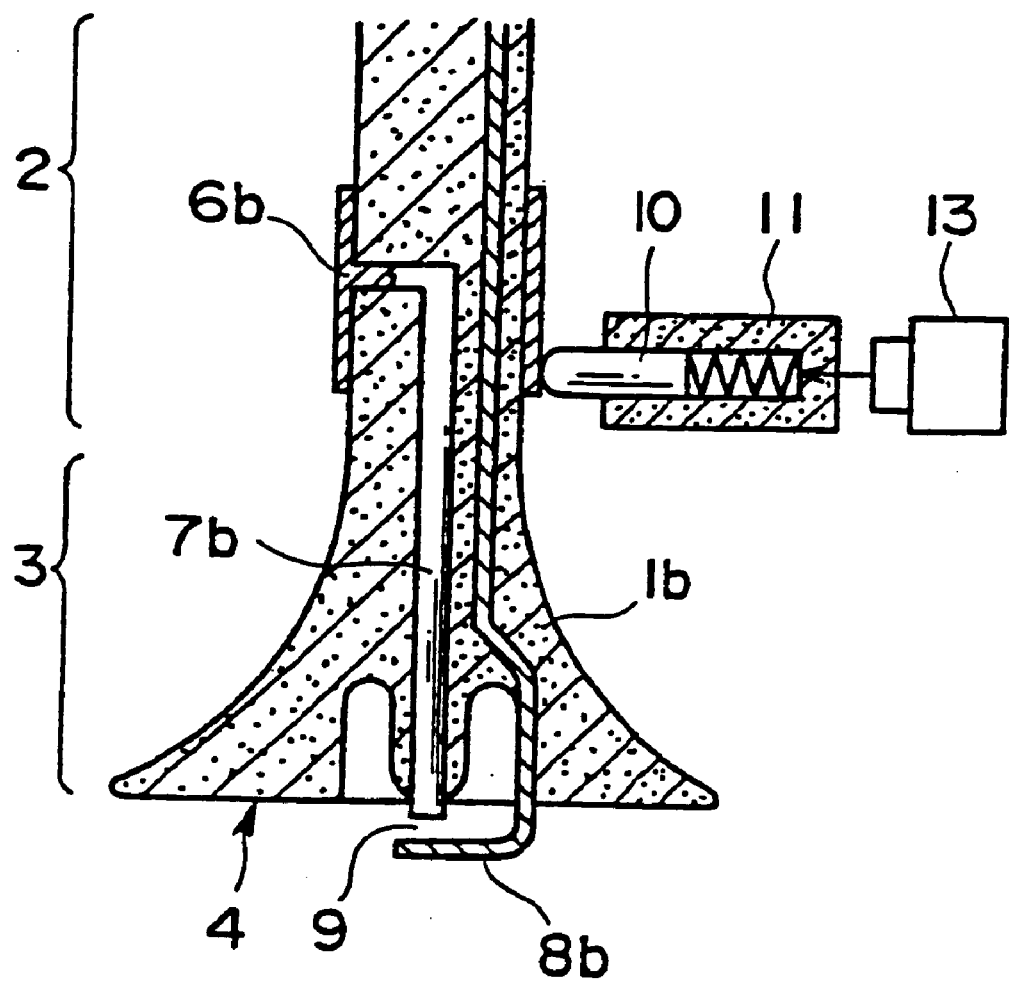
FIG. 3 is a longitudinally sectional view of major parts of an engine valve integral with spark plug features, which is made of insulative material, according to a second embodiment of the invention.

FIG. 3 shows the second preferred embodiment of the invention, which is a longitudinally sectional view of an engine valve integral with spark plug features, the body of which is made of insulative material such as ceramic, etc.

The first electrode rod 7b exposed to the center of the cylinder-side plane 4 downward of the bevel portion 3 of the engine valve body 1b made of a non-conductive material such as ceramic constitutes the center electrode and is incorporated in the engine valve body 1b. Furthermore, the first electrode rod 7b is connected to the current collector ring 6b circumferentially attached to the stem portion of the engine valve body 1b, and the same extends from the current collector ring 6b to the center inside the engine valve body 1b, is bent to a right angle at the internal center position thereof, and straightly passes downward therethrough, wherein one end thereof is exposed to the center of the cylinder-side plane 4.

Furthermore, such a construction that the current collector ring 6b is slidably brought into contact with the electric energy feeding electrode element 10 for ignition, which is connected to the electric energy generator for ignition such as an ignition coil or distributor, or the allotter thereof 13, and receives electric energy for ignition, is identical to that of the first preferred embodiment shown in FIG. 1 and FIG. 2.

The second electrode portion 8b which constitutes the grounding electrode forms a spark gap 9 in such a manner that one end of the electrode rod incorporated with a spacing from the first electrode rod 7b in the valve stem portion 2 is exposed to the cylinder-side plane 4, is bent to be L-shaped and is opposite to the first electrode rod 7b.

Figure 4:
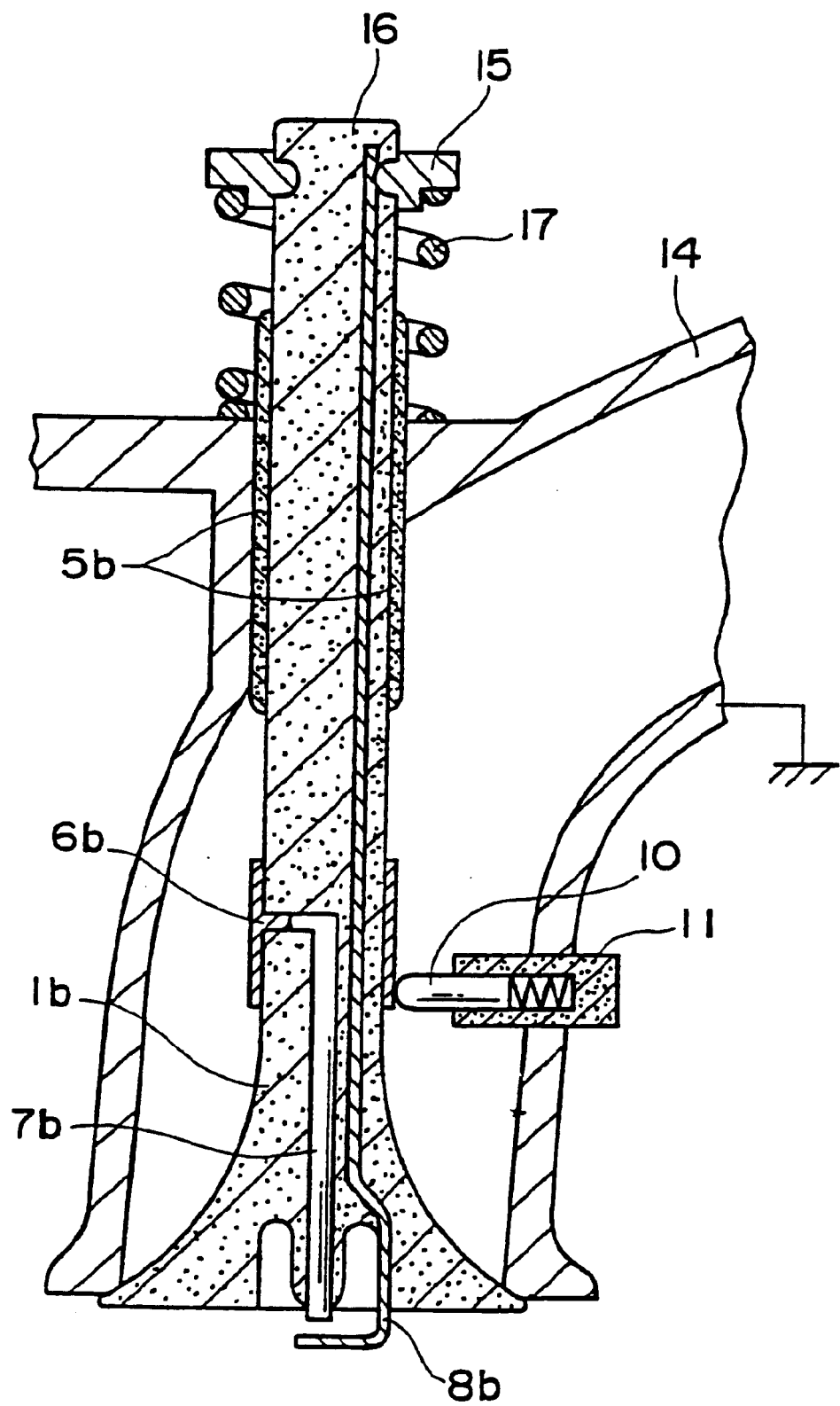
FIG. 4 is a cross-sectional view showing an incorporation of the same valve into the cylinder head.

FIG. 4 is a cross-sectional view showing that an engine valve integral with spark plug features, made of insulative material shown in FIG. 3, is incorporated in the cylinder head 14. The engine valve body 1b made of insulative material is incorporated in the earthed cylinder head 14 by the construction similar to that of FIG. 2. The second electrode portion 8b is composed of an electrode rod which straightly extends downward from the stem head 16, passing through inside the valve body 1b.

Furthermore, the second electrode portion 8b is grounded via the cotter 15, valve spring 17, and cylinder head 14.

Figure 5:
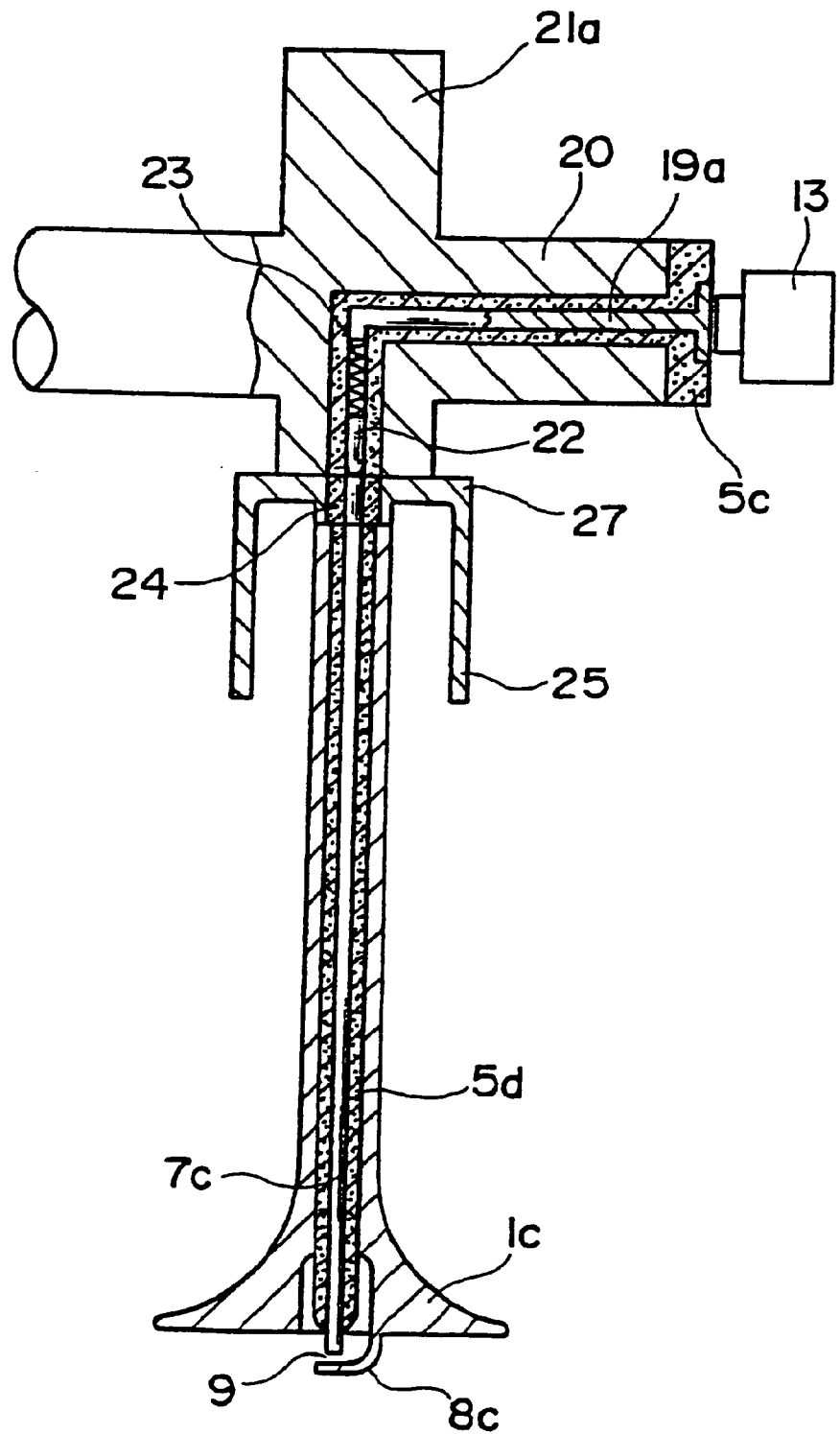
FIG. 5 is a cross-sectional view of the first preferred embodiment of a valve operating mechanism.

FIG. 5 is a cross-sectional view of the first embodiment of a valve operating mechanism which drives an engine valve integral with spark plug features.

A feeder pass 19a, one end of which is connected to the electric energy generator for ignition such as an ignition coil or distributor, etc., or the allotter 13 thereof, is caused to rotate in interlock with drive of the engine and connects the inside of the cam shaft 20, which opens and closes the engine valve, to the electric energy feeding electrode element 22 for ignition, which is caused to extend toward the cam 21a fixed to be integral with the cam shaft 20 and formed inside the cam 21a.

The electric energy feeding electrode element 22 for ignition is pressed and retained by a conductive spring 23 in the direction of protrusion, and the tip end thereof is exposed to the surface of the cam 21a. When the tip end of the electric energy feeding electrode element 22 for ignition is pressed and brought into contact with the electric energy feeding fixed contact point for ignition, which is exposed to and formed at the top plate of a valve lifter 25 attached to the upper part of the engine valve body, electric energy for ignition can be securely transmitted to the first electrode rod 7c which is incorporated in the valve body with an insulative material 5d intervened therebetween and constitutes the center electrode. Thereby, a spark is emitted at the spark gap 9 between the first electrode rod 7c and the second electrode portion 8c made of conductive material, which is made integral with the engine valve body 1c and forms an L-shaped grounding electrode.

Figure 6:
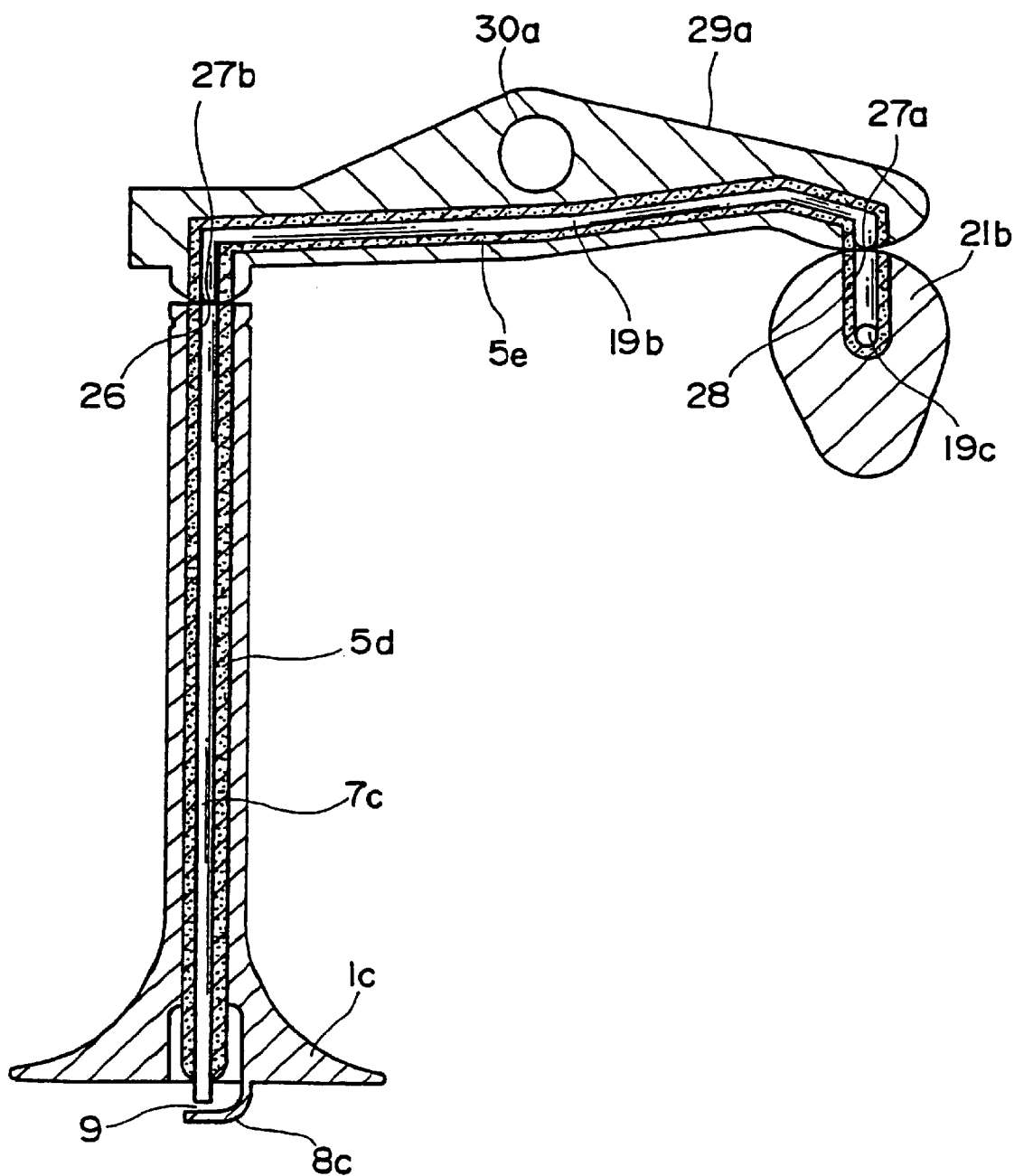
FIG. 6 is a cross-sectional view of the second preferred embodiment of the valve operating mechanism.

FIG. 6 is a cross-sectional view of the second preferred embodiment of a valve operating mechanism which drives an engine valve integral with spark plug features.

The first feeder pass 19c connected to the electric energy generator for ignition such as an ignition coil or distributor, etc., or the allotter thereof 13 is provided in the cam 21b fixed to be integral with the cam shaft (omitted in FIG. 6) which rotates in interlock with drive of the engine, wherein the feeder pass 19c which feed current to the first center electrode is exposed to the surface of the cam 21b and forms an electric energy feeding movable contact point 28 for ignition.

The feeder pass 19b feeding current to the second center electrode, one end of which passes through inside the rocker arm 29a, is exposed to the sliding surface with the cam 21b and forms an electric energy feeding fixed contact point 27a for ignition brought into contact with the movable contact point 28 of the first feeding pass, and the other of which is exposed to the valve stem fitting surface and forms the electric energy feeding fixed contact point 27b for ignition connected to the electric energy feeding fixed contact point 26 for ignition, of the first electrode rod 7c exposed to the upper end portion of the valve stem, is provided at the rocker arm 29a with an insulative material 5e intervened therebetween.

The electric energy feeding movable contact point 28 for ignition, secured on the surface of the cam 21b, is brought into contact with the electric energy feeding fixed contact point 27a secured at one end of the rocker arm 29a rocking, with the rocker arm pivotal axis 30a used as its rocking axis, in interlock with rotations of the cam 21b. Thereby, the electric energy for ignition is transmitted to the first electrode rod 7c of the engine valve via the feeder pass 19b, electric energy feeding fixed contact point 27b for ignition, and electric energy feeding fixed contact point 26 for ignition in the rocker arm 29a.

The first electrode rod 7c of the engine valve is incorporated in the valve body perpendicularly in the axial direction with insulative material 5d intervened therebetween and constitutes the center electrode, and the same forms a spark gap 9 between the electrode rod 7c and the second electrode portion 8c which is formed to be integral with the engine valve body 1c made of conductive material and constitutes the grounding electrode.

Furthermore, the valve body 1c, cam 21a and cam shaft 20 are made of insulative material in the first embodiment shown in FIG. 5, and the valve body 1c, cam 21b and rocker arm 21b can be also made of insulative material in the second embodiment shown in FIG. 6. In this case, the center electrode which constitutes the spark plug features is formed so that one end of the first electrode rod 7b shown in FIG. 4 is exposed to the upper end surface of the valve stem and the other end thereof is caused to straightly pass through inside the valve body and is exposed to the center of the cylinder-side plane 4, and the same is caused to face the second electrode portion 8b formed by the same construction as that shown in FIG. 4, there forming an ignition gap 9. The electric energy for ignition to the center electrode 7b is introduced from the feeder pass 19a incorporated in the cam shaft 20 of the first embodiment or the feeder pass 19b incorporated in the rocker arm 29a of the second embodiment to the center electrode via a contact point at one end of the first electrode 7b which is the center electrode exposed to the upper end surface of the valve stem.

Figure 7:
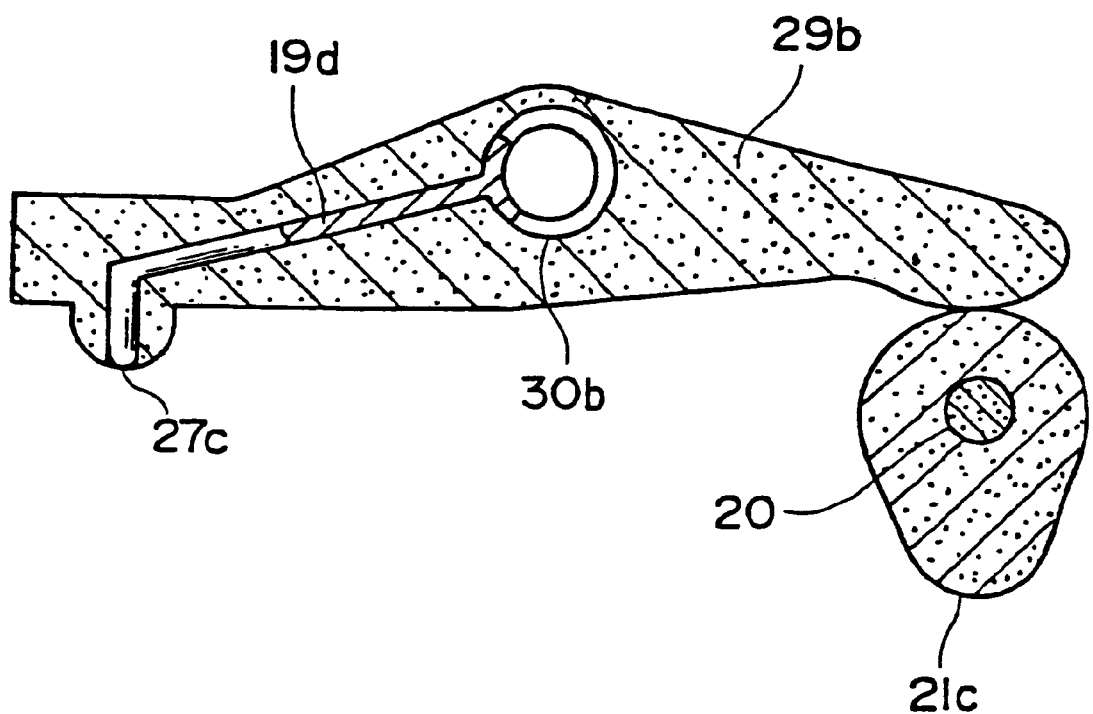
FIG. 7 is a partially cross-sectional view of a third embodiment.
Figure 8:
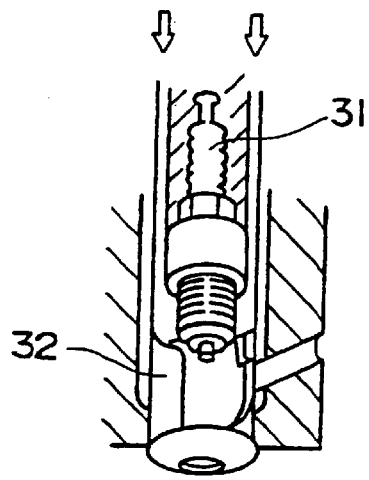
FIG. 8 is a view of the first conventional example.
Figure 9:
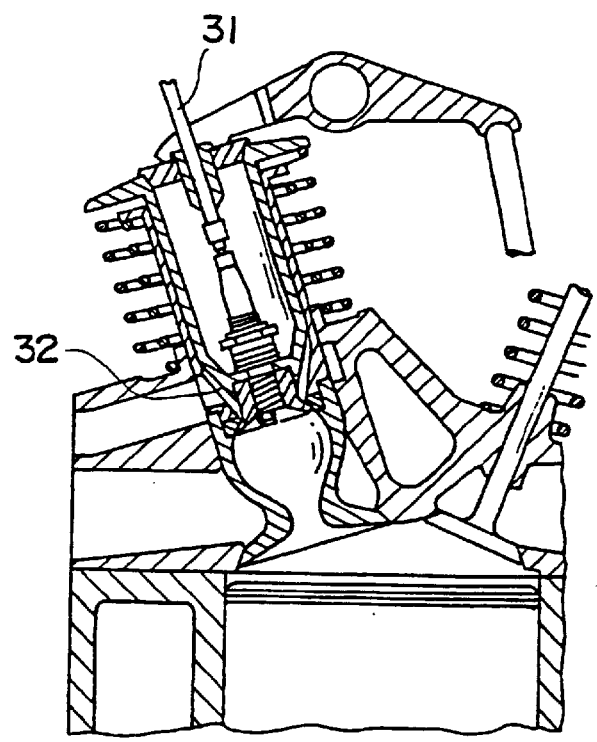
FIG. 9 is a view of the second conventional example.

FIG. 7 is a partially cross-sectional view of the third embodiment of a valve operating mechanism which drives an engine valve integral with spark plug features.

The feeder pass 19d, which feeds current to the center electrode, having one end connected to the electric energy generator for ignition such as an ignition coil or distributor, etc. or the allotter 13 thereof, is caused to extend into the rocker arm 29b made of insulation material, via the pivotal axis 30b of the rocker arm 29b which rocks by rotations of the cam 21c fixed to be integral with the cam shaft 20 rotating in interlock with drive of the engine.

The feeder pass 19d is caused to pass through inside the rocker arm 29b and exposed to the valve stem fitting surface, wherein the same forms an electric energy feeding fixed contact point 27c for ignition, which is connected to the center electrode of the engine valve.

Furthermore, it may be possible that a conductive material is used for the rocker arm 29b of the third embodiment of the valve operating mechanism and the feeder pass 19d is caused to extend inside the rocker arm 29b via an insulative material.

Industrial Feasibility

A description is given of the effects of the representative embodiment of the invention disclosed by this application.

(1) Since the engine valve and spark plug can be made compact and integral with each other, it becomes possible to attach them to a general four-cycle gasoline engine, and they are practical.

(2) Since the engine valve and spark plug are made integral with each other and made compact in size, the freedom of design of combustion chamber can be increased, and the heat efficiency can be improved.

(3) Since the caliber of the valve body can be made smaller than the conventional type, and the weight is decreased, the load of valve operation can be reduced to cause the combustion efficiency can be further improved.

(4) Furthermore, in a valve operating mechanism by which an engine valve integral with spark plug features according to the invention, it is not necessary for the feeder pass of electric energy for ignition to be disposed outside the system by internally incorporating the feeder pass to the center electrode existing in the valve in the cam shaft, and it is possible to provide a compact valve operating mechanism in which an ignition mechanism and a valve operating mechanism are made integral with each other, thereby causing the freedom of design of the peripheral mechanisms to be increased.

Therefore, the invention is applicable to an engine valve integral with spark plug features and an engine valve and a valve operating mechanism equipped with an engine valve integral with spark plug features.

What is claimed is:

1. An engine valve integral with spark plug features in which the spark plug features are made integral with an engine valve having its bevel portion, which closes an intake and exhaust pass open to a cylinder, made integral with a valve stem portion, wherein said spark plug is formed of a first electrode rod which is incorporated in the valve body, exposed to the cylinder-side plane of the bevel portion and forms the center electrode, and a second electrode portion which is exposed to be L-shaped from the cylinder-side plane of the bevel portion and forms a grounding electrode faced to said center electrode.

2. An engine valve integral with spark plug features as set forth in claim 1, wherein said engine valve body is made of conductive material which functions as a conductive pass of said second electrode portion, and an insulative material is caused to intervene between said first electrode rod and engine valve body.

3. An engine valve integral with spark plug features as set forth in claim 1, wherein said second electrode portion is formed of an electrode rod which is incorporated so as to pass through the engine valve body made of insulative material in the axial direction thereof.

4. An engine valve integral with spark plug features as set forth in claim 1, wherein a feeder pass which feeds current to the center electrode is constructed of a current collector ring which is made continuous to said first electrode rod and is circumferentially attached to the valve stem portion, and an electric energy feeding electrode element for ignition, which is pressed by a spring and retained so that the tip end thereof is slidably brought into contact with said current collector ring.

5. A valve operating mechanism comprising a cam shaft rotating interlock with drive of an engine and a cam fixed to be integral with the cam shaft, which is slidably brought into contact with the upper end portion of the stem of an engine valve described in claim 1, wherein a feeder pass having one end connected to an electric energy generator for ignition such as an ignition coil or distributor, or the allotter thereof, and the other end passing through the cam shaft and cam, exposed to the surface of the cam and brought into contact with the first electrode rod exposed to the upper end portion of the valve stem, is attached to said cam shaft.

6. A valve operating mechanism as set forth in claim 5, wherein a contact point of said feeder pass with the first electrode rod is constructed of an electric energy feeding electrode element for ignition, which is internally incorporated in the cam and retained so that the tip end thereof is pressed and retained by a conductive spring in a direction of protruding from the cam surface.

7. A valve operating mechanism comprising a cam shaft rotating in interlock with drive of an engine, a cam fixed to be integral with said cam shaft, and a rocker arm, having one end slidably brought into contact with said cam and the other end brought into contact with the upper end portion of an engine valve, which is caused to rock in interlock with rotations of the cam, and opening and closing the engine valve in interlock with rocking of the rocker arm, wherein a feeder pass forming an electric energy feeding movable contact point for ignition, which feeds current to the first center electrode, is attached to said cam shaft, in which one end thereof is connected to an electric energy generator for ignition such as an ignition coil or distributor, or the allotter thereof, and the other end thereof passes through the cam shaft and cam and is exposed to the cam surface, and wherein a feeder pass being brought into contact with the first electrode rod, which feeds current to the second electrode, is attached to said rocker arm so as to pass through inside the rocker arm, in which one end thereof is exposed to the sliding face with the cam and is brought into contact with the movable contact point of said first feeder pass, and the other end thereof is exposed to the valve stem fitting plane and is brought into contact with the first electrode rod exposed to the upper end portion of the valve stem.

8. A valve operating mechanism as set forth in claim 7, wherein a contact point of said second feeder pass with the first electrode rod and/or contact point with said first feeder pass is constructed of an electric energy feeding electrode element for ignition, which is disposed in the rocker arm, having the tip end thereof pressed by a conductive spring and retained in a direction protruding from the surface of the rocker arm.

9. A valve operating mechanism as set forth in claim 7, further comprising a cam shaft rotating in interlock with drive of an engine, a cam fixed to be integral with said cam shaft, and a rocker arm having one end slidably brought into contact with said cam and the other end brought into contact with the upper end portion of an engine valve, which is caused to rock in interlock with rotations of the cam, and opening and closing the engine valve in interlock with rocking of the rocker arm, wherein a feeder pass, which is brought into contact with the first electrode rod exposed to the upper end portion of the valve stem, having one end connected to an electric energy generator for ignition such as an ignition coil or distributor, or the allotter thereof via a pivotal axis of the rocker arm, and the other end exposed to the valve stem fitting plane through inside the rocker arm, is provided at said rocker arm.

* * * * *